(12) United States Patent
Brabec

(10) Patent No.: US 11,228,329 B2
(45) Date of Patent: Jan. 18, 2022

(54) METHOD AND APPARATUS FOR INTERFERENCE MONITORING OF RADIO DATA SIGNALS

(71) Applicant: Topcon Positioning Systems, Inc., Livermore, CA (US)

(72) Inventor: Vernon Joseph Brabec, Livermore, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 108 days.

(21) Appl. No.: 15/477,392

(22) Filed: Apr. 3, 2017

(65) Prior Publication Data

US 2018/0287645 A1 Oct. 4, 2018

(51) Int. Cl.
| | |
|---|---|
| *H04B 1/10* | (2006.01) |
| *H04B 15/02* | (2006.01) |
| *H04W 72/04* | (2009.01) |
| *H04W 72/08* | (2009.01) |
| *H04W 4/02* | (2018.01) |

(52) U.S. Cl.
CPC .......... *H04B 1/1027* (2013.01); *H04B 15/02* (2013.01); *H04W 4/02* (2013.01); *H04W 72/0453* (2013.01); *H04W 72/082* (2013.01)

(58) Field of Classification Search
CPC ...... H04B 17/15; H04B 17/29; H04B 17/345; H04B 17/0085; H04W 24/06
See application file for complete search history.

(56) References Cited

U.S. PATENT DOCUMENTS

| | | | |
|---|---|---|---|
| 6,751,467 B1 | 6/2004 | Cameron et al. | |
| 7,365,678 B2 | 4/2008 | Heine et al. | |
| 7,808,428 B2 | 10/2010 | Whitehead et al. | |
| 9,971,020 B1 * | 5/2018 | Maher | G01S 13/64 |
| 10,229,698 B1 * | 3/2019 | Chhetri | G10L 21/0208 |
| 2003/0194980 A1 | 10/2003 | Peterson, III et al. | |
| 2009/0197539 A1 * | 8/2009 | Shiba | H04W 72/085 455/67.11 |
| 2010/0123627 A1 * | 5/2010 | Reynolds | G01S 5/021 342/451 |

(Continued)

FOREIGN PATENT DOCUMENTS

| | | |
|---|---|---|
| EP | 1489432 A1 | 12/2004 |
| EP | 2128841 | 12/2009 |

(Continued)

OTHER PUBLICATIONS

International Search Report and Written Opinion dated Jul. 4, 2018, in connection with International Patent Application No. PCT/US2018/023239; 13 pgs.

*Primary Examiner* — Omer S Mian
*Assistant Examiner* — Bao G Nguyen
(74) *Attorney, Agent, or Firm* — Chiesa Shahinian & Giantomasi PC

(57) ABSTRACT

A method and apparatus is provided for enhanced signal interference monitoring by sampling a signal of interest and using a representation of the sampled signal in combination with certain audio output capabilities to determine the nature of either the primary received data signal or the secondary interfering signals without requiring any specialized, dedicated external equipment, additional hardware and/or disturbing the primary functions of a radio modem.

30 Claims, 4 Drawing Sheets

(56) References Cited

U.S. PATENT DOCUMENTS

| | | |
|---|---|---|
| 2012/0195350 A1 | 8/2012 | Das et al. |
| 2012/0275350 A1* | 11/2012 | Kwok ................... H04B 1/406 |
| | | 370/277 |
| 2012/0320759 A1* | 12/2012 | Shao ................... H04W 88/02 |
| | | 370/242 |
| 2013/0271318 A1 | 10/2013 | Doucet et al. |
| 2013/0272457 A1 | 10/2013 | Ilie et al. |
| 2014/0162555 A1* | 6/2014 | Wernaers .............. H04W 76/28 |
| | | 455/41.2 |
| 2015/0116145 A1 | 4/2015 | Ashjaee |
| 2015/0154973 A1* | 6/2015 | McKenna .............. H04H 60/31 |
| | | 704/211 |
| 2016/0037364 A1* | 2/2016 | Kairouz ................ H04L 1/0015 |
| | | 370/252 |
| 2017/0085600 A1* | 3/2017 | Carter ................... H04L 65/403 |
| 2018/0197148 A1* | 7/2018 | Liu ................. G06Q 10/063114 |
| 2018/0287645 A1* | 10/2018 | Brabec ................ H04B 1/1027 |

FOREIGN PATENT DOCUMENTS

| | | |
|---|---|---|
| EP | 2544023 | 1/2013 |
| WO | 2008106252 A1 | 9/2008 |

* cited by examiner

METHOD AND APPARATUS FOR INTERFERENCE MONITORING OF RADIO DATA SIGNALS

TECHNICAL FIELD

The present invention relates generally to radio modems, and, more particularly, to interference monitoring associated with digital data transfers over dedicated radio channels.

BACKGROUND OF THE INVENTION

For both Global Navigation Satellite Systems (GNSS) and Local Positioning Systems (LPS), there often exists the need to use a dedicated data channel between two locations, for example, between a user and a remote piece of equipment. For example, typical real-time kinematic (RTK) GNSS applications use radio modems over a dedicated radio channel to transfer GNSS satellite readings between a base location and a rover location (e.g., a dozer) in order to achieve a very high degree of location precision.

The digital data transmitted over one or more channels of such dedicated radio links may include commands, control data and observation data that the user requires to obtain an accurate position at a current user location. In some cases the radio data channel is provided by utilizing existing wireless infrastructure, such as a third party supplied cellular or Wi-Fi network, but in many cases where an existing third party wireless infrastructure does not exist, the user must provide a suitable replacement. In such cases, one type of a user supplied infrastructure configuration in use today is a narrowband single frequency radio system.

When using a single frequency radio system, licensing of the channel is often contingent upon recognizing and giving priority to other uses of the particular frequency of the channel, such as voice. Also, when using a radio modem to communicate data, in such single frequency radio systems, from one point to other point(s), user intervention is rarely needed given the robust nature of the connection state. However, data transmission errors or other anomalies between, for example, the base location and the rover may occur for a variety causes such as (1) the rover is out range or the received signal is weak; (2) the rover is on the wrong communication channel; (3) there is voice or other interference (e.g., another base transmitter) on the same channel; (4) improper base configuration resulting in shorter or longer packets than normal; (5) improper base configuration resulting from different modulation settings between the base and the rover; and/or (6) incompatible data rate transmission resulting is dropped packets.

In order to determine if any of the above-described errors or anomalies are causing reception issues, one common technique is to use a specialized external device to monitor the transmitted signal. Such external devices include radio receivers, spectrum analyzers and handheld scanners which can all be deployed in the field and allow the user to "listen in" on the transmitted signal to ascertain transmission quality. Of course, this requires the acquisition and availability of such specialized, dedicated external devices in the field in order to equip and train the users with respect to these monitoring capabilities.

Of course, the aforementioned features could be integrated into the GNSS equipment, however, with modern implementations where the radio modem apparatus (and functionality) is already integrated into another device, for example, a GNSS receiver or optical total station, there is no justification from a cost or space justification to include additional circuitry, such as an additional audio amplifier and speaker, to monitor the channel for the detection of interference which may occasionally disrupt the positioning operation. As a result, the user is deprived of a simple but effective method to recognize setup issues, equipment malfunctions, or duplicate use of the radio channel while performing the primary positioning function.

Therefore, a need exists for an improved methodology that will allow for improved interference monitoring of radio data signals in a streamlined way with reduced cost, without the need for specialized, dedicated external equipment, and without sacrificing any precision accuracy.

BRIEF SUMMARY OF THE EMBODIMENTS

In accordance with various embodiments, a radio modem apparatus and method is disclosed that provides for enhanced signal interference monitoring by sampling a signal of interest and using a representation of the sampled signal in combination with certain audio output capabilities to determine the nature of either the primary received data signal or the secondary interfering signals without requiring any specialized, dedicated external equipment, additional hardware and/or disturbing the primary function (i.e., to receive and decode the data signals of interest) of the radio modem.

In accordance with an embodiment, this enhanced signal interference monitoring of radio data signals is achieved through the utilization of certain signal sampling in the radio modem, data communication between the radio modem and a user interface, and a signal presentation on a communications device (i.e., a user device). Advantageously, the enhanced signal monitoring is realized with existing radio modem functionality and leveraging the radio modem's existing capabilities.

In particular, in accordance with an embodiment, the signal sampling encompasses the sampling that the radio modem normally uses to convert the baseband signal of interest into a form that is further processed, by either hardware or firmware, and converted back into the primary data signal(s). In particular, the sampling of the in-band digital signal occurs before any data demodulation thereof. These pre-existing raw data samples, in accordance with an embodiment, are delivered directly to a user's existing communications device (e.g., smartphone, tablet, and the like) and represent an accurate image of the signal that is appearing at the input to the signal processing operations of the radio modem, and allows the user to detect and recognize various forms of incorrect signal(s) affecting the operation of the modem. In accordance with an embodiment, these input data samples are unprocessed (i.e., have yet to be demodulated) and represent the complete sum of all signals within the bandwidth limited operating communication channel, and will also indicate to the user if there are adjacent channel signals (i.e., interfering signals) of sufficient strength that manage to pass through the front end filtering and affect the in-band signals. That is, in accordance with the embodiment, the un-modulated in-band digital samples are used to identify whether there exist other signals that are presently interfering with the primary signal (i.e., the signal of interest).

In accordance with an embodiment, these raw data samples are communicated to the user's device, in replacement of or in addition to the demodulated data of interest during normal radio modem operation and data transmission. This additional raw data can be output, either automatically or at the user's request, in a form useful for the user to determine the source and/or nature of any abnormal operation (e.g., signal interference) and thereby facilitate corrective action, for example, by the user to address the particular data signal issue. This raw data, in accordance with an embodiment, can be output on the display on the user's device in a graphical format, with or without additional processing, and represent the signal in either the frequency or time domains.

In accordance with a further embodiment, the raw data samples are presented to the user as an auditory rendering of a representation of the in-band signal present at the input to the modem's processing means (i.e., a plurality of data samples resulting from a sampling of at least one input radio data signal) allowing the user to take correction action based on what the user actually hears from the audible rendering.

These and other advantages of the embodiments will be apparent to those of ordinary skill in the art by reference to the following detailed description and the accompanying drawings.

DETAILED DESCRIPTION

In accordance with various embodiments, a radio modem apparatus and method is disclosed that provides for enhanced signal interference monitoring by using additional audio output capabilities to determine the nature of either the primary received data signal or the secondary interfering signals without requiring any specialized, dedicated external equipment, additional hardware and/or disturbing the primary function (i.e., to receive and decode the data signals of interest) of the radio modem.

Figure 1:
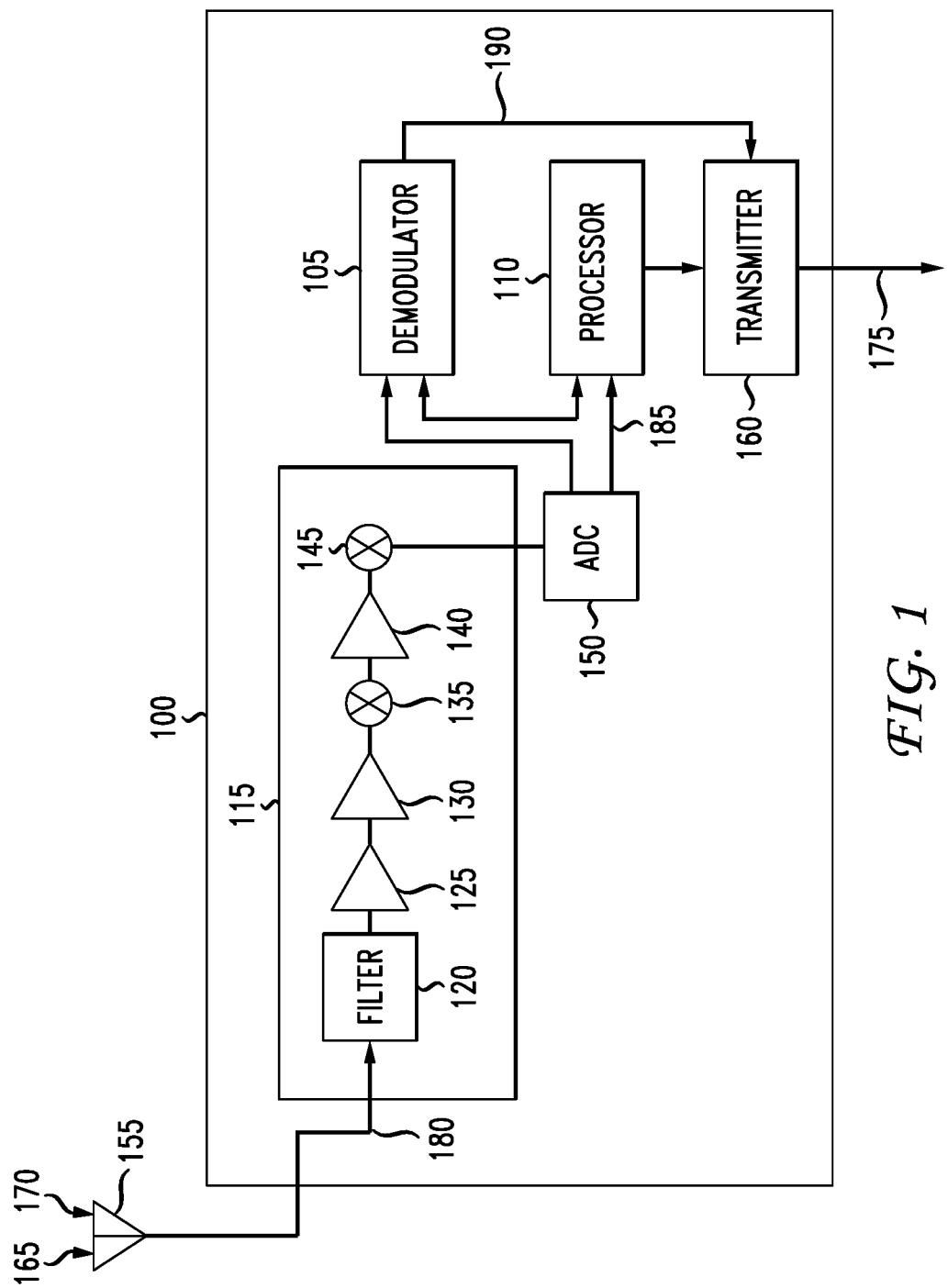
FIG. 1 shows an illustrative radio modem configured in accordance with an embodiment.

FIG. 1 shows an illustrative radio modem 100 configured in accordance with an embodiment. As shown, radio modem 100 includes demodulator 105, processor 110, antenna 155, transmitter 160 and RF front end 115 As will be appreciated, RF front end 115 functionality is well-known and generally operates between an antenna and the digital baseband system. That is, basic RF architecture applies in the various embodiments herein such as signal filtering, detection, amplification and demodulation. The RF front end, such as RF front end 115, processes modulated signals received from the antenna (e.g., antenna 155) into signals suitable for input into a baseband analog-to-digital converter (e.g., ADC 150). RF front end 115 includes filter 120, operational amplifier 125, operational amplifier 130, mixer 135, IF gain amplifier 140, and mixer 145. As will be appreciated, the RF front end may have other components not shown herein and, similarly, a typical radio modem will have other components not shown in FIG. 1 such as a modulator, band filters, splitters, noise filters, and the like for processing radio signals in a well-known fashion. The principles embodied by the various embodiments herein apply equally to various RF front end and radio modem configurations as such the illustrative configuration of FIG. 1 is one of many such configurations in which the principles and advantages of the disclosed embodiments apply.

In accordance with an embodiment, enhanced signal interference monitoring of radio data signals is achieved through the utilization of certain processes related to a sampling of the signal in radio modem 100, data communication between radio modem 100 and a user interface, and a signal presentation on a user device. Advantageously, the enhanced signal monitoring of the embodiment is realized with existing radio modem functionality and leveraging the radio modem's existing capabilities.

Turning our attention to the sampling undertaken in radio modem 100 in accordance with an embodiment, it will be readily understood that radio modem 100 in the normal course will receive one or more data signals 165 (i.e., the primary signal) and may also receive one or more secondary interfering signal(s) 170. For example, data signal 165 may be a primary signal across a dedicated data channel (not shown in FIG. 1) that includes commands, control data and/or observation data that a user requires to obtain an accurate position at the user's current location. However, in the field, it may be that the transmission of data signal 165 is subjected to interfering signal 170 on the same frequency of a particular radio channel such as a voice signal. As such, the presence of interfering signal 170 may cause degradation in the transmission of the primary signal, i.e., data signal 165, for which corrective action will be necessary to restore reliable data transfer across the particular data channel of the dedicated radio link.

That is, when the primary signal (e.g., data signal 165) is being interfered with by another signal (e.g., by interfering signal 170) the normal processing in radio modem 100 is structured solely to decode primary data, and fails to decode correctly when that primary data is in a form that radio modem 100 is not designed to process. As such, under such conditions, the result will be that radio modem 100 delivers incorrect, incomplete and/or no data whatsoever. Further, the incorrect form of the radio signal can be due to a variety of causes, and the number of forms this can take is beyond the ability of a conventional radio modem to correctly anticipate and deal with.

Advantageously, the enhanced signal monitoring of the embodiment is realized with existing radio modem functionality and leveraging the radio modem's existing capabilities. More particularly, as will also be appreciated, radio modem 100, among other operations, will convert in a well-known fashion the baseband signal of interest (i.e., the primary signal) into a form that is further processed (by either hardware or firmware) and converted back into the primary data signal (e.g., data in signal 165). In a well-known fashion, radio modem 100 will utilize digital signal sampling techniques that will sample and store raw analog-to-digital samples of the baseband signal and later convert them back to a copy of the original digital data for transmission.

These raw sampled signals are not useful to a user during normal operation, and as such are normally not delivered directly to the user. However, these pre-existing raw data samples, if delivered directly to the user's data collection device, represent an accurate image of the signal (e.g., signal 180) that is appearing at the input to the signal processing by the radio modem, and allows the user, with minimal training and experience, to detect and recognize the many forms of incorrect data affecting the correct operation of the modem.

As such, the aforementioned pre-existing raw data samples, in accordance with an embodiment, will be utilized to realize and delivery enhanced signal monitoring from radio modem 100. Since the data samples are taken at the input of the radio modem and are not processed, it also represents the complete sum of all signals within the bandwidth limited operating channel, and will also indicate to the user if there are adjacent channel signals (i.e., interfering signals) of sufficient strength that manage to pass through the front end filtering and affect the in-band signals. As such, an audible rendering of the representation of the sampled signal from the radio modem is transmitted by radio modem, received by a communications device and audibly rendered to a user. More particularly, processor 110 will receive raw data samples 185 (i.e., a plurality of data samples) as sampled from ADC 150 and output raw data sample 185 which, in turn, can be transmitted as signal 175 from transmitter 160 in a form useful (as further detailed herein below) for the user to determine, as further detailed herein below, the source and/or nature of any abnormal operation(s) and allow for corrective to be undertaken. That is, in accordance with the embodiment, the un-modulated in-band digital samples are used to identify whether there exist other signals that are interfering with the primary signal (i.e., the signal of interest). As will be appreciated, the data samples utilized in delivering the interference monitoring of the various embodiments herein may be data samples that represent either unprocessed AM samples as detailed above and/or an FM voice signal. That is, processor 110 in addition to operating with unprocessed AM samples can also FM discriminate the incoming data stream and deliver data samples that represent the particular audio waveform (i.e., the audio representation to be transmitted to the user device) form the FM voice signal.

In accordance with an embodiment, the processing and data channel capabilities of radio modem 100 will enable these raw data samples to be passed to the user's device via transmitted signal 175, in replacement of or in addition to the demodulated data of interest during normal operation. For example, demodulated data 190 from demodulator 105. In accordance with alternative embodiments, this additional raw data can either automatically be provided or be provided at the user's request. For example, transmitted signal 175 can be output on the display of the user's device in a graphical format, with or without additional processing, and represent the signal in either the frequency or time domains. However, this form of output is most suited for technically advanced users and is not well suited for the average user. As such, in accordance with a further embodiment as detailed below, the transmitted signal for the radio modem is presented to the user in a more user-friendly form that enhances and facilitates the ability of the user to take corrective action when needed to address signal interference.

Figure 2:
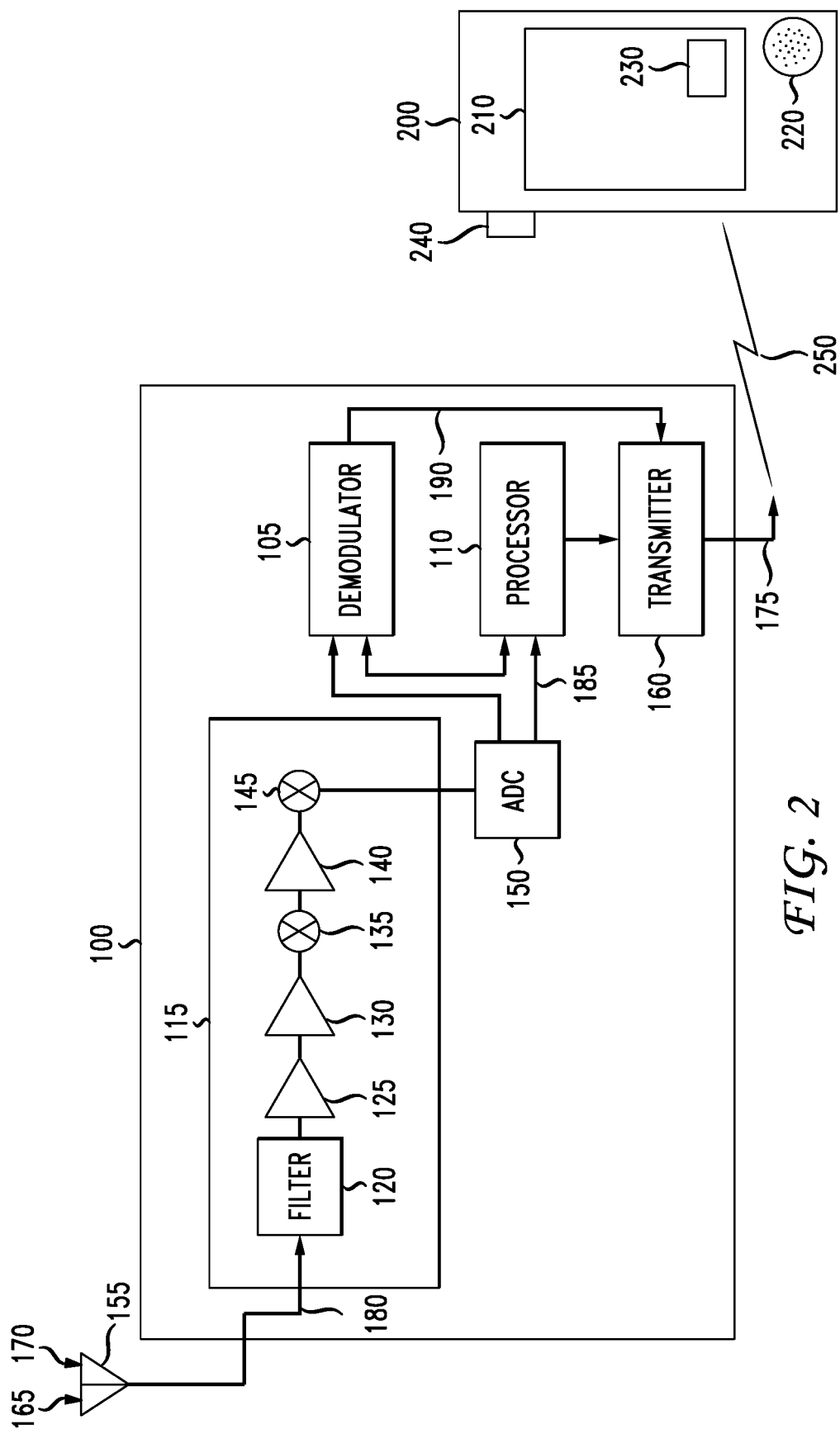
FIG. 2 shows a high-level block diagram of the radio modem of FIG. 1 coupled to an illustrative communications device for signal interference monitoring in accordance with an embodiment.

FIG. 2 shows a high-level block diagram of radio modem 100 of FIG. 1 coupled to illustrative communications device 200 in accordance with an embodiment. Of course, it is not uncommon for user communication devices today, whether a computer, tablet or smartphone, to name just a few, to include built-in audio features that, with a small amount of additional functionality (e.g., software), are capable of presenting to the user a representation of the in-band signal present at the input to the processor 110 of radio modem 100. Advantageously, the signal interference monitoring of the various embodiments is delivered on a common user communication device without the need for any other specialized, dedicated device for such purposes. For example, communications device 200 has a display 210 (e.g., a touch screen display), speaker 220, button 240 and soft button 230. Such conventional functionality of communications device 200 represents, therefore, a very natural and efficient way to present the transmitted signals from radio modem 100 to the user and delivery the enhanced signal interference monitoring in accordance with an embodiment.

Illustratively, given that the receiving radio modem, for example, radio modem 100, is set up to interface with a transmitter at a pre-determined frequency, to activate the signal interference monitoring of the embodiments herein, the user may press one button, for example button 240 or soft button 230, on communications device 200 and hear immediately what is affecting the normal operation of radio modem 100 through the above-detailed aspects of the embodiments. For example, in accordance with an embodiment, an audible rendering of the representation of the sampled signal (i.e., the plurality of data samples) from the radio modem is transmitted by radio modem 100, received by communications device 200 and audibly rendered on speaker 220. As such, the user can take (or not take) corrective action based on what the user hears from the transmission of the audio sampled signal representation in accordance with embodiment. As highlighted above, the data samples utilized in delivering the interference monitoring of the various embodiments herein may be data samples that represent either unprocessed AM samples as detailed above and/or an FM voice signal. That is, processor 110 in addition to operating with AM samples to the deliver the audio sampled signal representation to communications device 200 can also FM discriminate the incoming data stream and deliver data samples that represent the particular audio waveform from the FM voice signal to communications device 200.

Illustratively, transmitted signal 175 (see, FIG. 1) is transmitted across connection 250 established between radio modem 100 and communications device 200 in any number of well-known manners. For example, transmitted signal may include a sampled audio data file in any number of well-known formats such RAW audio format (i.e., audio files using the file extensions .raw or .pcm) and connection 250 may be a wireless connection over a Wi-Fi network or wired connection such as an Ethernet cable connection. As such, the principles and advantages embodied by the various embodiments herein apply equally to various communications interfaces and signal sampling techniques and their associated formats.

Such audio data files are particularly useful for one of the most prevalent forms of interference, that is, when other licensed users attempt to use the same channel for voice communications. In accordance with the embodiment, the user, when invoking the signal interference functionality through communications device 200, will immediately hear the voice and be able to quickly change to another authorized but unused channel. That is, an audible rendering of the representation of the sampled signal from the radio modem is transmitted by radio modem, received by a communications device and audibly rendered to a user. After switching to the new channel, this enhanced functionality of the embodiment can also give immediate feedback to the user to verify that the new channel (i.e., the switched-to channel) is indeed unoccupied. The function is also useful when other interference issues, such as channel mismatch (i.e., no normal signal), two transmitters (i.e., conflicting pair of normal signals), incorrect settings (i.e., truncated or abnormal radio signals) are present. In all such cases, the user can quickly learn to distinguish the various audio forms of these impairments, and the user device can also have pre-stored examples to assist the user quickly learn distinguish between various forms of signal impairments.

Figure 3:
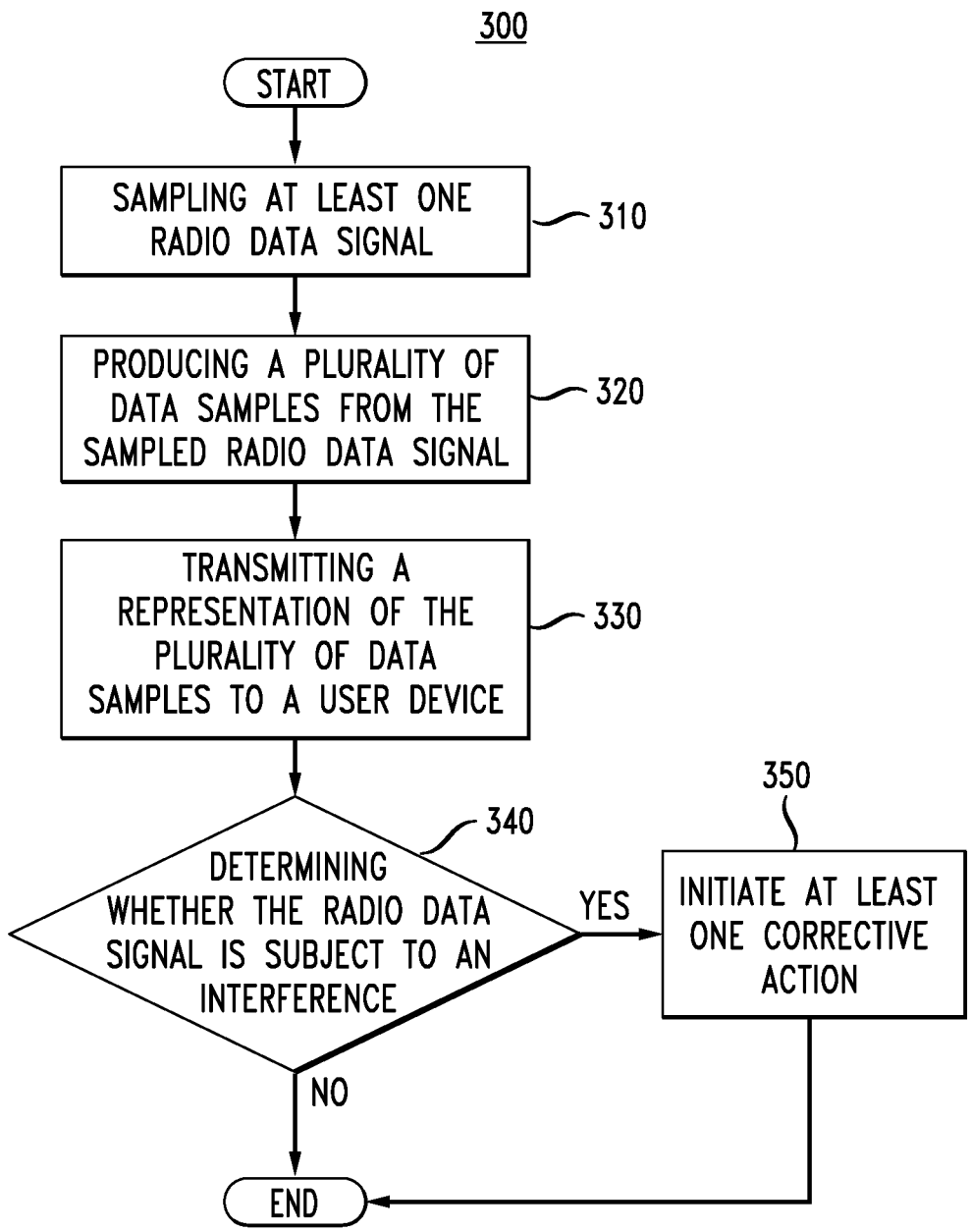
FIG. 3 shows a flowchart of illustrative operations for signal interference monitoring in accordance with an embodiment.

FIG. 3 shows a flowchart of illustrative operations 300 for signal interference monitoring in accordance with an embodiment. Illustratively, as detailed above, the interference monitoring involves at least one radio data signal being transmitted across a channel of a plurality of channels associated with a dedicated radio link. In accordance with the operations of FIG. 3, step 310 is a sampling (illustratively, by radio modem 100 as detailed above) of at least one radio data signal and, at step 320, producing a plurality of data samples from the sampling of the at least one radio data signal. As detailed above, the sampling is performed before any data demodulation of the input radio data signal and the digital signal sampling thereof may be in accordance with a variety of well-known sampling techniques. As such, at step 330, there is a transmitting of a representation of the plurality of data samples from the radio modem to a communications device. As detailed above, the communications device may be a variety of conventional devices such as a wireless handset, smartphone, tablet or portable computer, to name just a few.

Advantageously, the interference monitoring delivered in accordance with the embodiment is realized directly on such conventional communications device(s) without any additional hardware implemented by the user and/or other specialized, dedicated devices for such purposes. From the transmission of the representation of the plurality of samples to the communications device there is a determining, at step 340, whether the at least one radio data signal is subject to an interference based on an audible rendering of the sampled signal representation on the communications device. If an interference is detected this allows the user to take at least one corrective action (at step 350) to eliminate the interference on the data channel, for example, by switching to another channel of the plurality of channels available on the dedicated radio link.

Figure 4:
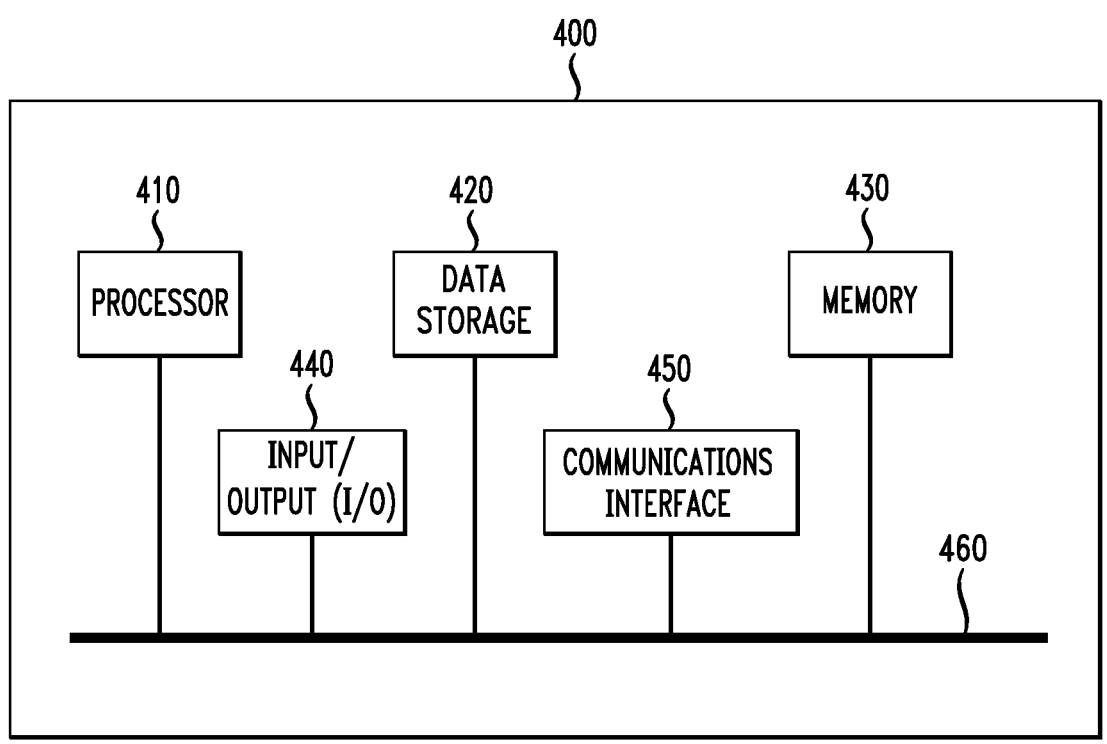
FIG. 4 is a high-level block diagram of an exemplary communications device in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "communications device") installed in and/or communicatively connected to a processor or the like. FIG. 4 is a high-level block diagram of an exemplary communications device 400 that may be used for implementing a method for monitoring signal interference in accordance with the various embodiments herein. Illustratively, communications device 400 might be a device such as a wireless handset (e.g., communications device 200), smartphone, tablet, or computer, to name a few.

Communications device 400 comprises a processor 410 operatively coupled to a data storage device 420 and a memory 430. Processor 410 controls the overall operation of communications device 400 by executing computer program instructions that define such operations. Communications bus 460 facilitates the coupling and communication between the various components of communications device 400. The computer program instructions may be stored in data storage device 420, or a non-transitory computer readable medium, and loaded into memory 430 when execution of the computer program instructions is desired.

Thus, the steps of the disclosed method (see, e.g., FIG. 3) and the associated discussion herein above can be defined by the computer program instructions stored in memory 430 and/or data storage device 420 and controlled by processor 410 executing the computer program instructions. For example, the computer program instructions can be implemented as computer executable code programmed by one skilled in the art to perform the illustrative operations defined by the disclosed method. Accordingly, by executing the computer program instructions, processor 410 executes an algorithm defined by the disclosed method. Communications device 400 also includes one or more communications interface 450 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Communications device 400 also includes one or more input/output devices 440 that enable user interaction with communications device 400 (e.g., camera, display, keyboard, mouse, speakers, microphone, buttons, etc.).

Processor 410 may include both general and special purpose microprocessors, and may be the sole processor or one of multiple processors of communications device 400. Processor 410 may comprise one or more central processing units (CPUs), for example. Processor 410, data storage device 420, and/or memory 430 may include, be supplemented by, or incorporated in, one or more application-specific integrated circuits (ASICs) and/or one or more field programmable gate arrays (FPGAs).

Data storage device 420 and memory 430 each comprise a tangible non-transitory computer readable storage medium. Data storage device 420, and memory 430, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 440 may include peripherals, such as a camera, printer, scanner, display screen, etc. For example, input/output devices 440 may include a display device such as a cathode ray tube (CRT), plasma or liquid crystal display (LCD) monitor for displaying information to the user, a keyboard, and a pointing device such as a mouse or a trackball by which the user can provide input to communications device 400.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for monitoring interference, the method comprising:
    receiving, at a radio modem, at least one radio data signal from a transmitting device across a particular one channel of a plurality of channels, the particular one channel associated with a dedicated radio link between the transmitting device and the radio modem;
    transmitting the at least one radio data signal to a demodulator of the radio modem to generate a decoded primary signal;
    producing a plurality of data samples from a sampling of the at least one radio data signal by a processor of the radio modem, the plurality of data samples comprising raw analog-to-digital samples of the at least one radio data signal sampled prior to demodulation and representing a complete sum of all signals within the particular one channel of a plurality of channels; and
    transmitting the raw analog-to-digital samples in replacement of demodulated data associated with the at least one radio data signal transmitted, as a representation of the at least one radio data signal present at an input to the radio modem, from the radio modem to user communications device for determining whether the at least one radio data signal is subject to a voice signal interference based on an audible rendering of the representation on the user communications device,
    wherein the audible rendering is of an audio waveform of the voice signal.

2. The method of claim 1, wherein the particular one channel of the plurality of channels is a bandwidth limited operating communication channel.

3. The method of claim 1 further comprising:
    activating, from the user communications device, the transmission of the representation.

4. The method of claim 2 further comprising:
    initiating at least one corrective action on the dedicated radio link in response to the audible rendering of the representation on the user communications device.

5. The method of claim 4 wherein the at least one corrective action includes switching from the particular one channel to a particular other channel of the plurality of channels.

6. The method of claim 1 wherein the interference is associated with an improper configuration of a transmitter that originated the transmission of the at least one radio data signal.

7. The method of claim 1 wherein the interference is associated with a signal strength disparity of the at least one radio data signal.

8. The method of claim 1 wherein the user communications device is a wireless handset.

9. The method of claim 8 wherein the at least one radio data signal includes GNSS satellite data useful for determining a location of a user associated with the wireless handset.

10. A radio modem comprising:
    a processor for sampling at least one radio data signal from a transmitting device and producing a plurality of data samples from the sampling of the at least one radio data signal, the plurality of data samples comprising raw analog-to-digital samples of the at least one radio data signal, the at least one radio data signal being received over a particular one channel of a plurality of channels, the particular one channel associated with a dedicated radio link between the transmitting device and the radio modem, the raw analog-to-digital samples sampled prior to demodulation and representing a complete sum of all signals within the particular one channel of a plurality of channels;
    a demodulator for receiving the at least one radio data signal and generating a decoded primary signal; and
    a transmitter for transmitting the raw analog-to-digital samples in replacement of demodulated data associated with the at least one radio data signal transmitted, as a representation of the at least one radio data signal present at an input to the radio modem, from the radio modem to user communications device for determining whether the at least one radio data signal is subject to a voice signal interference based on an audible rendering of the representation on the user communications device,
    wherein the audible rendering is of an audio waveform of the voice signal.

11. The radio modem of claim 10 wherein the particular one channel of the plurality of channels is a bandwidth limited operating communication channel.

12. The radio modem of claim 10 wherein the transmitting the representation is initiated from the user communications device.

13. The radio modem of claim 10 wherein at least one corrective action is taken on the dedicated radio link in response to the audible rendering of the representation on the user communications device.

14. The radio modem of claim 13, wherein the at least one corrective action includes switching from the particular one channel to a particular other channel of the plurality of channels.

15. The radio modem of claim 10 wherein the interference is associated with disparate modulation configurations between the transmitter and a receiver exchanging the at least one radio data signal.

16. A system for monitoring interference, the system comprising:
    a radio modem for sampling at least one radio data signal transmitted over a particular one of a plurality of channels associated with a dedicated radio link between a transmitting device and the radio modem, and for producing a plurality of data samples from the sampling of the at least one radio data signal, the plurality of data samples comprising raw analog-to-digital samples of the at least one radio data signal sampled prior to demodulation and representing a complete sum of all signals within the particular one channel of a plurality of channels, and transmitting the raw analog-to-digital samples as a representation of the at least one radio data signal present at an input to the radio modem in replacement of demodulated data associated with the at least one radio data signal transmitted;

a demodulator of the radio modem, the demodulator for receiving the at least one radio data signal and generating a decoded primary signal; and a user communications device for receiving the transmitted representation of the raw analog-to-digital samples, and determining whether the at least one radio data signal is subject to a voice signal interference based on an audible rendering of the representation on the user communications device, wherein the audible rendering is of an audio waveform of the voice signal.

17. The system of claim 16 wherein the raw analog-to-digital samples are un-modulated in-band digital samples, and the raw analog-to-digital samples are communicated in replacement of demodulated data associated with the at least one radio data signal transmitted.

18. The system of claim 16 wherein the user communications device is a wireless handset.

19. A non-transitory computer-readable medium storing computer program instructions for monitoring interference, the computer program instructions, when executed on a processor, cause the processor to perform operations comprising:

receiving at least one radio data signal from a transmitting device across a particular one channel of a plurality of channels, the particular one channel associated with a dedicated radio link between the transmitting device and the processor;

transmitting the at least one radio data signal to a demodulator to generate a decoded primary signal;

producing a plurality of data samples from a sampling of the at least one radio data signal, the plurality of data samples comprising raw analog-to-digital samples of the at least one radio data signal sampled prior to demodulation and represent a complete sum of all signals within the particular one channel of a plurality of channels;

transmitting the raw analog-to-digital samples in replacement of demodulated data associated with the at least one radio data signal transmitted, as a representation of the at least one radio data signal present at an input to the processor, from the processor to user communications device; and determining whether the at least one radio data signal is subject to a voice signal interference based on an audible rendering of the representation on the user communications device, wherein the audible rendering is of an audio waveform of the voice signal.

20. The non-transitory computer-readable medium of claim 19 wherein the particular one channel of the plurality of channels is a bandwidth limited operating communication channel.

21. The non-transitory computer-readable medium of claim 19 wherein the user communications device is a tablet.

22. The non-transitory computer-readable medium of claim 19 wherein the interference is associated with disparate modulation configurations between a transmitter and a receiver exchanging the at least one radio data signal.

23. The non-transitory computer-readable medium of claim 19 wherein the at least one radio data signal includes a plurality of data packets, and the interference is associated with a disparate packet size between particular ones of the data packets of the plurality of data packets.

24. A user communications device comprising:

a receiver for receiving a plurality of data samples in replacement of demodulated data associated with at least one radio data signal transmitted, the plurality of data samples being a representation of the at least one radio data signal present at an input to a radio modem for demodulation to generate a decoded primary signal, the plurality of data samples comprising raw analog-to-digital samples of the at least one radio data signal, and wherein the raw analog-to-digital samples are produced from a sampling of at least one radio data signal associated with a particular one channel of a plurality of channels, the raw analog-to-digital samples sampled prior to demodulation and representing a complete sum of all signals within the particular one channel of a plurality of channels the particular one channel associated with a dedicated radio link between a transmitting device and the radio modem; and a processor for determining whether the at least one radio data signal is subject to a voice signal interference based on an audible rendering of the representation on the user communications device, wherein the audible rendering is of an audio waveform of the voice signal.

25. The user communications device of claim 24 wherein the particular one channel of the plurality of channels is a bandwidth limited operating communication channel.

26. The user communications device of claim 24 wherein the user communications device is a wireless handset.

27. The user communications device of claim 26 wherein the at least one radio data signal includes GNSS satellite data useful for determining a location of a user associated with the wireless handset.

28. The user communications device of claim 24 further comprising:

a speaker for listening to the audible rendering of the representation.

29. The user communications device of claim 24 wherein the interference is associated with disparate modulation configurations between a transmitter and the receiver exchanging the at least one radio data signal.

30. The user communications device of claim 24 wherein the at least one radio data signal includes a plurality of data packets, and the interference is associated with a disparate packet size between particular ones of the data packets of the plurality of data packets.

* * * * *